(12) United States Patent
Qian et al.

(10) Patent No.: US 6,184,630 B1
(45) Date of Patent: Feb. 6, 2001

(54) ELECTRONIC LAMP BALLAST WITH VOLTAGE SOURCE POWER FEEDBACK TO AC-SIDE

(75) Inventors: Jinrong Qian, Croton-on-Hudson; Gert W. Bruning, Sleepy Hollow, both of NY (US)

(73) Assignee: Philips Electronics North America Corporation, New York, NY (US)

( * ) Notice: Under 35 U.S.C. 154(b), the term of this patent shall be extended for 0 days.

(21) Appl. No.: 09/245,757

(22) Filed: Feb. 8, 1999

(51) Int. Cl.$^7$ .................................................... H05B 37/02
(52) U.S. Cl. ...................... 315/224; 315/307; 315/291; 315/DIG. 7
(58) Field of Search .................................. 315/307, 267, 315/209 R, 219, DIG. 7, 224, 243, 241 R, 291, DIG. 5

(56) References Cited

U.S. PATENT DOCUMENTS

| | | | |
|---|---|---|---|
| 4,234,822 | * 11/1980 | Garrison et al. | ................. 315/209 R |
| 5,223,767 | * 6/1993 | Kulka | ................................ 315/209 R |
| 5,387,848 | * 2/1995 | Wong | .................................... 315/224 |
| 5,608,295 | 3/1997 | Moisin | .................................. 315/247 |
| 5,828,185 | * 10/1998 | Fellows et al. | ...................... 315/246 |
| 5,898,278 | * 4/1999 | Muessli | ............................ 315/209 R |

* cited by examiner

Primary Examiner—Don Wong
Assistant Examiner—Tuyet T. Vo

(57) ABSTRACT

Power factor is improved, and line current total harmonic distortion (THD) is reduced by feeding high frequency current from a voltage source directly to one of the AC-side rectifier terminals. The low frequency power source presents a low value capacitive source impedance to the AC-side rectifier terminals. A resonant load lamp circuit is connected between an inverter output node and one of the DC outputs of the input rectifier circuit. A high frequency capacitor is connected between an AC-side terminal of the input rectifier circuit and a voltage source such as one of the lamp terminals or the inverter output. If the connection is to the inverter output, preferably a second high frequency capacitor is connected from the other of the AC-side terminals to the inverter output.

12 Claims, 4 Drawing Sheets

ELECTRONIC LAMP BALLAST WITH VOLTAGE SOURCE POWER FEEDBACK TO AC-SIDE

CROSS-REFERENCE TO RELATED APPLICATIONS

SELF-OSCILLATING RESONANT CONVERTER WITH PASSIVE FILTER REGULATOR, Ser. No. 09/221,954, filed by C. Chang and assigned to the assignee of the instant application.

STATEMENT REGARDING FEDERALLY SPONSORED RESEARCH OR DEVELOPMENT

Not Applicable

BACKGROUND OF THE INVENTION

The invention relates to electronic ballasts for operating discharge lamps such as fluorescent lamps, and in particular to such ballasts having a minimum number of active components.

Most magnetically coupled self-oscillating inverters are manufactured in large quantities for sale in a highly competitive market. Half-bridge inverters are widely used because they have a relatively low parts count. Such inverters may be classified into two groups: those using a current transformer having a saturable core, generally together with power BJT's (bipolar junction transistors); and those using a current transformer having a linear core, generally together with MOSFETs (metal oxide semiconductor field effect transistors). As those of ordinary skill will recognize, in this context a linear core is one in which operation is over a region having a curved B-H characteristic, rather than a sharp B-H characteristic; that is, at all times the flux level is such that a significant increase in magnetizing current will be accompanied by a significant increase in flux level.

U.S. Pat. No. 5,608,295 discloses such a ballast circuit having a linear core resonance inductor in a series connected load circuit between the inverter output and signal ground. The inductor has secondary windings connected to the control electrodes of the switching transistors. The load circuit includes a tuning capacitor C8 and the primary winding of a matching transformer. Fluorescent lamps are connected to a secondary winding or windings of the matching transformer, and one or two additional tuning capacitors are connected across the lamps. A feedback conductor is connected between a tap on the primary winding of the matching transformer and a node between two 47 nf feedback capacitors which are connected in series across the AC input to a full wave bridge rectifier circuit. This patent teaches that the low frequency (power line) input current modulates in amplitude the high frequency feedback current which works as a carrier in order to transfer the low frequency input current through the bridge rectifier over most of the low frequency cycle. Accordingly it is clear that the line current is still discontinuous.

BRIEF SUMMARY OF THE INVENTION

An object of the invention is to provide a cost-effective solution to power factor correction in electronic ballasts.

According to the invention, in a low frequency to high frequency power converter including:

a capacitive source impedance source of low frequency line voltage, having source connection points between which the low frequency line voltage is maintained, a DC supply circuit having at least two diodes and four terminals, and an energy storage capacitor, two of these terminals being AC-side terminals connected to the source connection points, and two of these terminals being DC-side terminals, one of the diodes being connected between one of the AC-side terminals and one of the DC-side terminals, a half-bridge inverter connected to receive DC voltage from the DC-side terminals, the inverter comprising two switching transistors connected in series and having an output node between the transistors for providing a high frequency output voltage, and a load circuit carrying a first high frequency current, connected between the output node and one of the DC-side terminals, the load circuit comprising a plurality of load circuit elements including a resonance inductor, at least one resonance capacitor forming part of a resonant circuit with the resonance inductor, and two load connection points for a non-linear load which is at least substantially resistive in an operating condition, a high frequency capacitor provides a path for a second high frequency current, the high frequency capacitor being connected between one of the AC-side terminals and a location along the load circuit at which there is a voltage at the high frequency, the high frequency capacitor having a value selected such that the high frequency capacitor receives energy from one of said AC-side terminals during a first portion of every cycle of the high frequency voltage, and the high frequency capacitor transfers energy to the energy storage capacitor during a different portion of every cycle of the high frequency voltage.

In a first preferred embodiment, the non-linear load is a discharge lamp. One of the connections for powering the lamp, directly or through a matching transformer, is at signal ground, and the voltage feedback capacitor is connected to the other connection. In this embodiment during normal operation the DC supply circuit never transfers energy directly from the AC-side terminals to the energy storage capacitor.

In another embodiment, the feedback capacitor is connected directly to the inverter output. Preferably, there are two feedback capacitors from that point, one to each side of the AC line between an EMI filter and the rectifier input. In this embodiment, during intervals between conduction by one switching transistor and the other, the capacitors provide current feedback to the AC-side, and one of the capacitors is discharged before the next turn on of a switching transistor. Further, during a portion of each high frequency cycle of normal operation the line input provides energy directly to the load circuit.

Preferably, the DC supply circuit is a full wave bridge rectifier, having a respective fast recovery diode in series with each of the bridge DC connections.

DETAILED DESCRIPTION OF THE INVENTION

Figure 1:
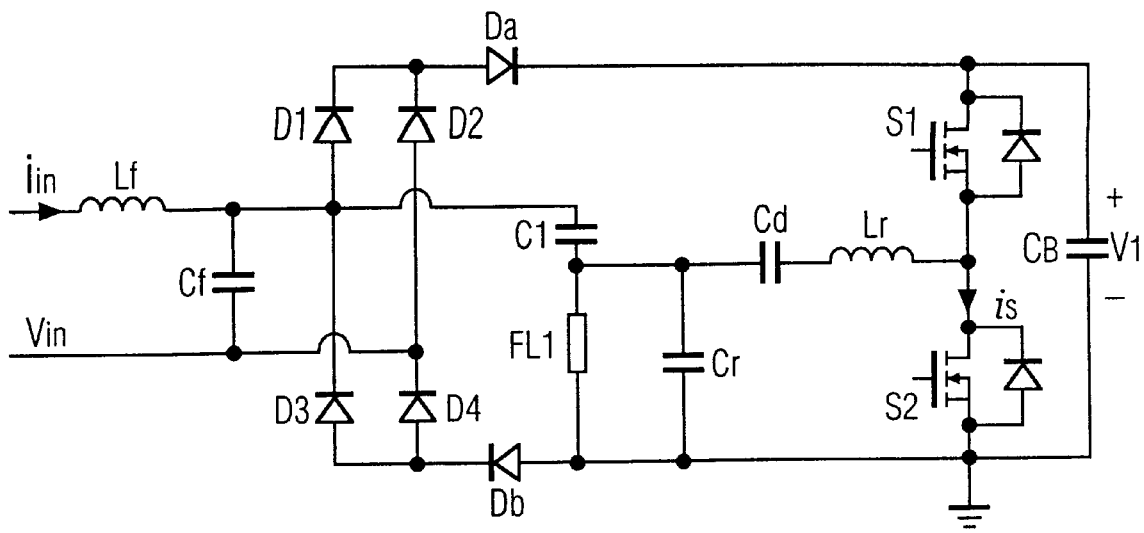
FIG. 1 is a simplified schematic diagram of a first lamp ballast in accordance with the invention.

The converter of FIG. 1 includes an inverter formed by switching transistors S1, S2 connected in series between a positive and a negative DC bus, with high voltage DC being stored in an electrolytic bulk capacitor CB. Power to the DC bus is supplied by a full wave bridge rectifier formed by slow diodes D1–D4, and two fast recovery diodes Da, Db. Line power to the bridge rectifier is provided through an EMI filter formed by a series inductor Lf and shunt capacitor Cf, to the two AC-side terminals of the bridge rectifier. Fast recovery diode Da is connected between the positive DC bus and the cathodes of slow diodes D1 and D2, and fast recovery diode Db is connected between the negative DC bus and the anodes of slow diodes D3 and D4. The positive and negative DC bus lines thus form the DC-side terminals of the rectifier circuit. This arrangement reduces the parts cost for the circuit, because fast recovery diodes are far more expensive than normal slow diodes. As will be clear to those of ordinary skill in the art, diodes Da and Db could be eliminated if the four bridge diodes are fast recovery types.

The load circuit is connected between the negative DC bus, which is signal ground, and the inverter output node between the two switches. The load circuit includes a linear core resonance inductor Lr, a blocking capacitor Cd, and a resonance capacitor Cr, with a fluorescent lamp FL1 connected in parallel with the resonance capacitor. A high frequency capacitor C1 is connected between the first terminal of the AC-side and the connection between the lamp terminal and the blocking capacitor, to provide energy transfer pulses during each high frequency cycle. Those of ordinary skill in the ballast art know that the circuit should be optimized so that the current through the lamp is sinusoidal, and the voltage across the lamp is constant. Accordingly the power feedback through capacitor C1 is substantially feedback from a constant AC voltage source.

Figure 2:
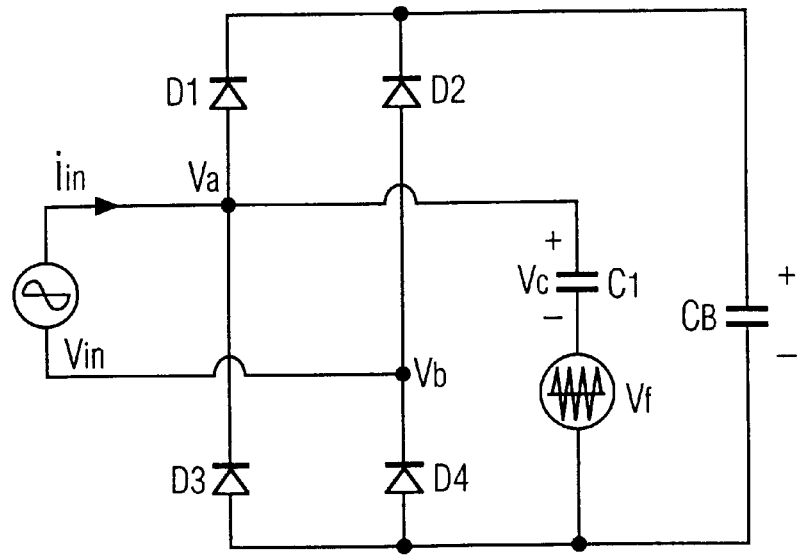
FIG. 2 is a conceptual circuit based on the embodiment of FIG. 1 showing voltage feedback to the AC-side.
Figure 3:
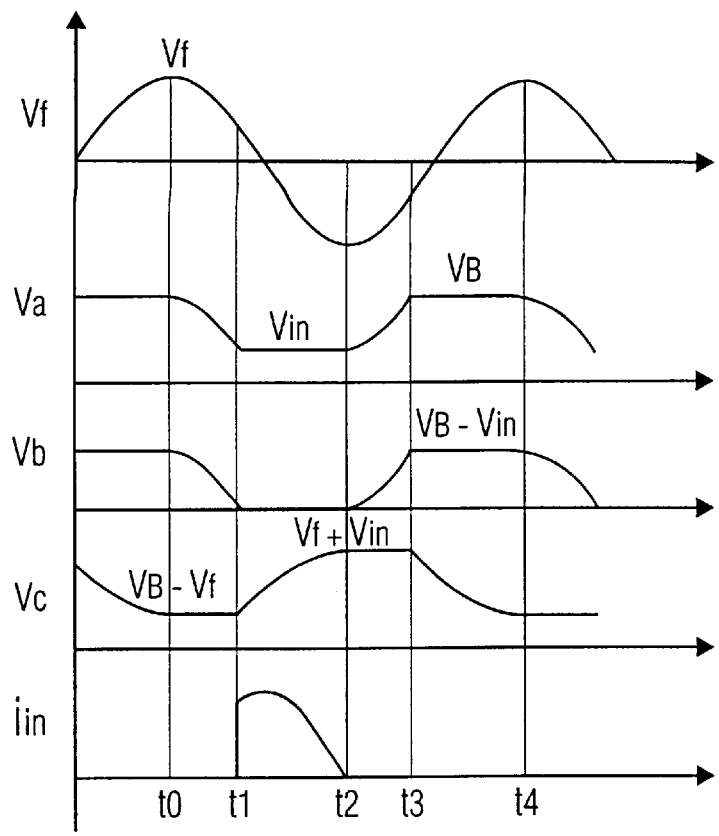
FIG. 3 is a timing diagram showing voltage and current waveforms for the circuit of FIG. 2.

The operation of the circuit of FIG. 1 can be understood by analysis of the behavior of the conceptual circuit shown in FIG. 2. A high frequency voltage source $v_f$ is an idealized equivalent of the load circuit of FIG. 1. This voltage is shown in the first line of FIG. 3, and reacts with the line voltage $v_{in}$ and the diodes D1–D4 and high frequency capacitor C1 to define four different stages of operation in one cycle.

At time $t_o$ the voltage $v_a$=VB, and $v_b$=VB−$v_{in}$. During a period from $t_o$ to $t_1$, the voltage $v_f$ is dropping from its peak, and as a result the voltages $v_a$ and $v_b$ both decrease. Diode D1 is turned off, because the voltage $v_a$<VB, the voltage across the bulk energy storage capacitor CB, and there is no current through capacitor C1. Time $t_1$ is reached when the voltage $v_a$ has dropped to the value $v_{in}$, and $v_b$=0.

From $t_1$ to $t_2$ diode D4 conducts, and current $i_{in}$ charges C1. Time $t_2$ is reached when $v_f$ reaches its negative peak, and diode D4 stops conducting. The maximum capacitor C1 voltage is $$V_{cmax}=Vf+v_{in}.$$

From $t_2$ to $t_3$ $v_f$ rises while diode D1 is reverse biased because $v_a$<VB. There is no line current and no current through capacitor C1 during this period, so $v_a$ and $v_b$ both increase. Time $t_3$ is reached when $v_a$=VB, and diode D1 starts to conduct.

From $t_3$ to $t_4$ diode D1 is conducting, and the capacitor C1 discharges through D1 as $v_f$ continues to rise. The discharge of capacitor C1 transfers energy to the bulk capacitor CB. There is no line current because diodes D2, D3 and D4 are cut off. Time $t_4$ is reached when voltage $v_a$=VB and $v_f$ has reached its peak value. The minimum capacitor C1 voltage is $V_{cmin}$=VB−Vf. The cycle then repeats.

From the above analysis it is clear that line current flows only when there is energy transfer into capacitor C1, and energy transfer into the bulk capacitor CB occurs only at a different time, from the high frequency capacitor C1.

Over a switching cycle, the average line input current is given by the equation $$i_{in,avg}=C1 \cdot f_s \, (v_{in}+2V_f-V_B),$$

where $f_s$ is the high frequency switching frequency of $V_f$. To achieve unity power factor, the peak-to-peak voltage of the source $v_f$ must equal the DC bus voltage, so $V_B$=2$V_f$. So long as the circuit is designed to satisfy this condition, the line input current will be proportional to line voltage, and the circuit has unity power factor.

Figure 4:
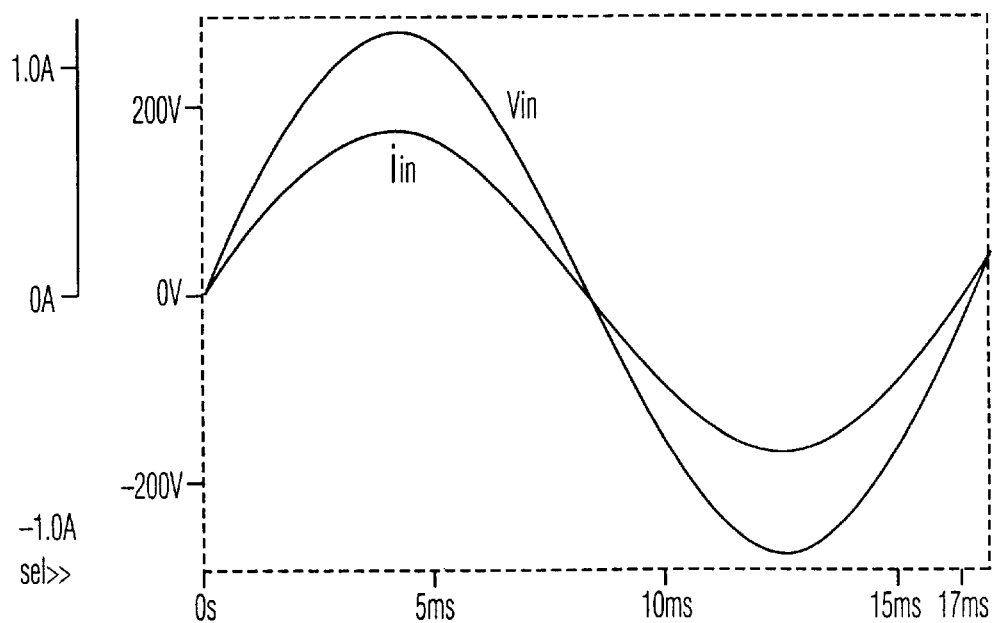
FIG. 4 is a simulation of line voltage and line current for the circuit of FIG. 2.

This circuit was simulated, and the simulated line current waveform is shown in FIG. 4. The figure shows that unity power factor is achieved. The sources of harmonic distortion are not noticeable by looking at the curves. However, FIG. 3 makes clear that the line current $i_{in}$ has large high frequency components, which because of finite line voltage source impedance will cause some corresponding high frequency voltage to be superimposed on the line voltage $v_{in}$. The input line filter formed by Lf and Cf in FIG. 1 will largely bypass this voltage from being conducted along the power line, but there will be some effect of these circuit values on operation of the balance of the circuit. This is ignored by the simulation, but does not affect the validity of the simulation as a tool in understanding circuit behavior.

The circuit of FIG. 1 provides power feedback proportional to the voltage across the lamp. However, capacitor C1 is in parallel with the resonant capacitor $C_r$ while either D1 or D4 are conducting, and the conducting time of these diodes is related to the instantaneous line voltage. Simple analysis is thus complicated by the change in resonant frequency of the load circuit occurring twice per cycle of inverter operation. However, it is clear that there will be a ripple in the lamp current at twice the input line frequency. This can be improved by frequency modulation of the inverter frequency, using switch drive circuitry of known types not shown in the simplified circuit. The inverter frequency can be frequency modulated as taught in U.S. Pat. No. 5,404,082 to Hernandez and Bruning, or by selection of appropriate frequency versus phase shift characteristics in the gate drive circuit, for example as taught in the co-pending application for a SELF-OSCILLATING RESONANT CONVERTER WITH PASSIVE FILTER REGULATOR, Ser. No. 09/221,954, filed by C. Chang and assigned to the assignee of the instant application, in order to improve lamp crest factor.

Figure 5:
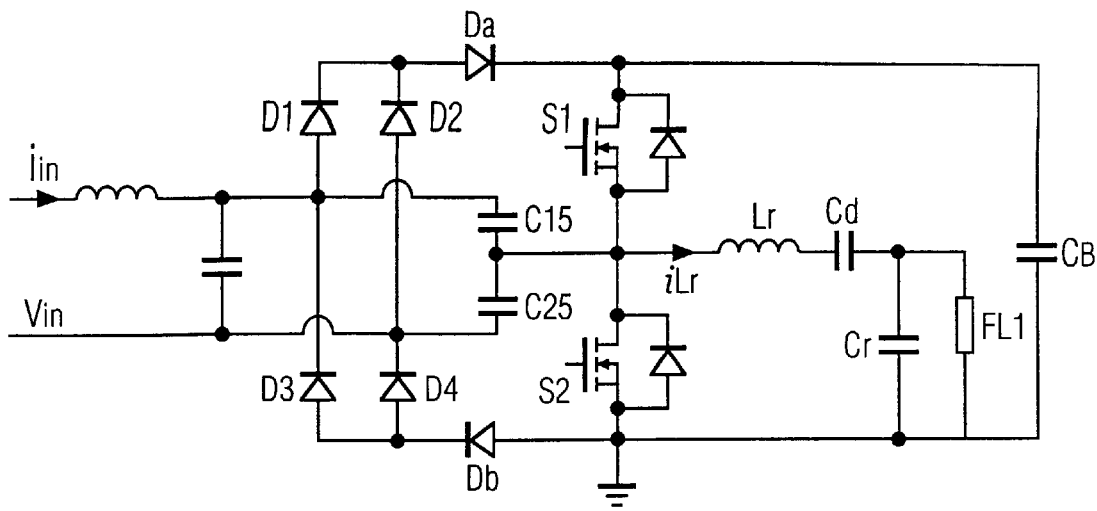
FIG. 5 is a simplified schematic diagram of a variation of the circuit of FIG. 1 having voltage feedback directly from the inverter.

Another arrangement using voltage source feedback for power factor correction is shown in FIG. 5. Here, rather than feedback from a sinusoidal voltage source, feedback is from the inverter output which, except for the times when both switches are off, is a square wave. Unlike prior art inverters where it is desirable that only a minimum time elapse between turn-off of one switch and turn-on of the other, sufficient to guarantee that circuit imperfections or other transients never cause both to be on simultaneously, in the circuit of FIG. 5 switch transistor S1 must not turn on until capacitor C15 is fully discharged; and similarly, S2 must not turn on until C25 is fully discharged. As a result, there are two dead time periods during each inverter cycle when the load current flows through the node between capacitors C15 and C25. During these periods the circuit behaves like a current source power feedback circuit.

Preferably S1 is turned on approximately as soon as C15 is completely discharged; and S2 is turned on approximately as soon as C25 is completely discharged. The dead time is determined by the values of C15 and C25, load current at the switching instant, and line voltage. To maintain switch turn-on when C15 or C25 is totally discharged at any line input voltage, the circuit has to be designed near the line peak voltage, where it will need the longest time to charge and discharge C15 and C25. The minimum dead time is determined by $$t_d = (C15 + C25) \cdot V_p / I_{Lr}$$

where Vp is the line peak voltage, and $I_{Lr}$ is the load current at the instant S2 is switched off. So long as the dead time is longer than given by this equation, C15 and C25 are guaranteed to completely discharge.

The operation of the circuit of FIG. 5 may best be understood by identifying current flows during a sequence of stages of each inverter cycle.

First, at all times $$v_a = v_b + v_{in}.$$

Evaluating the circuit as one with ideal components, just before S1 starts conducting, $$v_a = v_n$$

and when switch S1 is conducting, $$v_n = V_B$$

By an analysis similar to that given above for FIG. 1, and considering a time when the line voltage $v_{in}$ is positive, it follows that just before S1 starts conducting, the line input directly provides energy through C25, while bulk capacitor CB is charged through both C15 and D1, and C25, the line input and D1. The optimal switching instant arrives when load current $i_{Lr}$ has charged C25 through the line input, and has discharged C15 until C15 is completely discharged. This instant can be determined, for example, by sensing that the inverter output node voltage has just become equal to the positive bus voltage. S1 is now switched on in order to achieve lossless switching.

When S1 is turned on, load current is still negative but is decreasing rapidly, and flows through the body diode of S1 and further charges CB. While S1 remains on, load current reverses and becomes positive as shown in FIG. 5. The turn-off time of S1 is controlled such that the inverter frequency is maintained higher than the load circuit resonant frequency.

When switch S1 is turned off, the voltage $v_n$ is no longer controlled by the switches, but load current $i_{Lr}$ will continue to flow. Feedback capacitor C25 will discharge through diode D4 and the load circuit. As the voltage across C25 drops, the voltage across C15 rises due to line current flowing through C15, the load circuit and diode D4. During this time period, the line input directly provides energy to the lamp through C15, and C25 is discharged by the load current $i_{Lr}$.

After C25 is fully discharged, S2 turns on. Load current $i_{Lr}$ continues to flow, but the inverter node cannot go negative because load current flows through the body diode of S2, although at a rapidly diminishing rate. When the load current reverses, and is again negative, Cd discharges through S2 and the load. During this time period the voltages across both C15 and C25 do not change.

Immediately after S2 is turned off, load current continues to flow in the negative direction. Part of the negative load current discharges C15, flows through D1 and Da and charges CB, while the rest of it charges C25 and flows through the line, D1 and Da and charges CB. When C15 is completely discharged, S1 is then turned on. The negative load current flows through the body diode of S1, and will reverse direction shortly and flow through S1.

From the above description it will be clear that the resonant circuit has one resonant frequency while only the resonance capacitor has an effect; that is, while one of the switching transistors is turned on and for a brief while after it has been turned off; and a higher resonant frequency while load current is also flowing through C15 and C25. In this latter time period the equivalent resonance capacitance is given by $$C_{eq} = C_r \cdot C15 \cdot C25 / (C_r \cdot C15 + C_r \cdot C25 + C15 \cdot C25)$$

Figure 6:
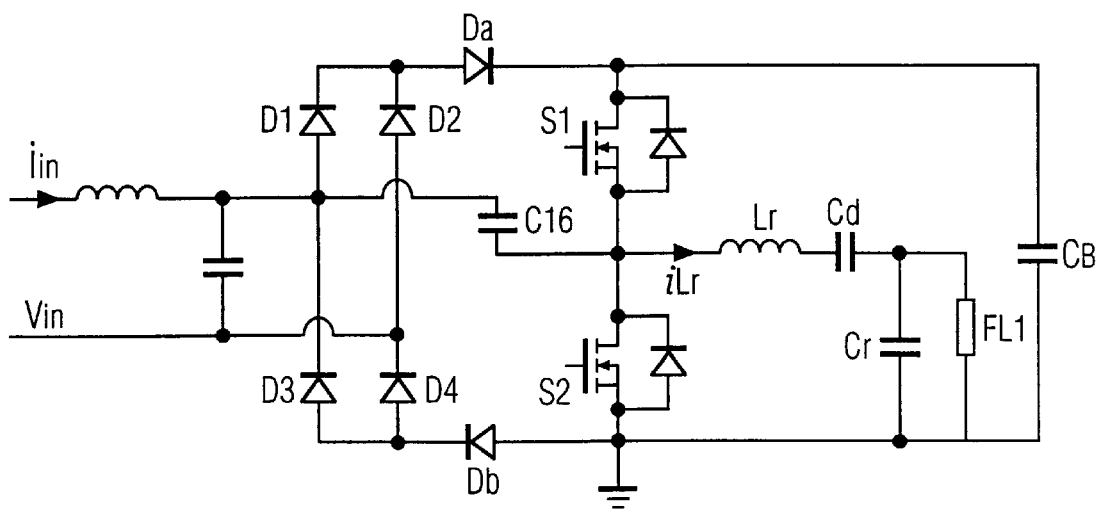
FIG. 6 is a simplified schematic diagram of a simpler circuit variation of the embodiment of FIG. 5.

The circuit of FIG. 6 operates generally like FIG. 5, except that capacitor C16 handles all the charge transfer so that the pulse currents from the line and into the bulk capacitor carry twice the energy.

The above analysis ignores the circuit values of the EMI filter. This is valid because the value of Cf should be sufficiently large that the impedance of Cf is very small, and the impedance of Lf is very high, at the inverter frequencies. As a result the voltage across Cf over one switching cycle is trivial compared with the other voltages involved.

Figure 7:
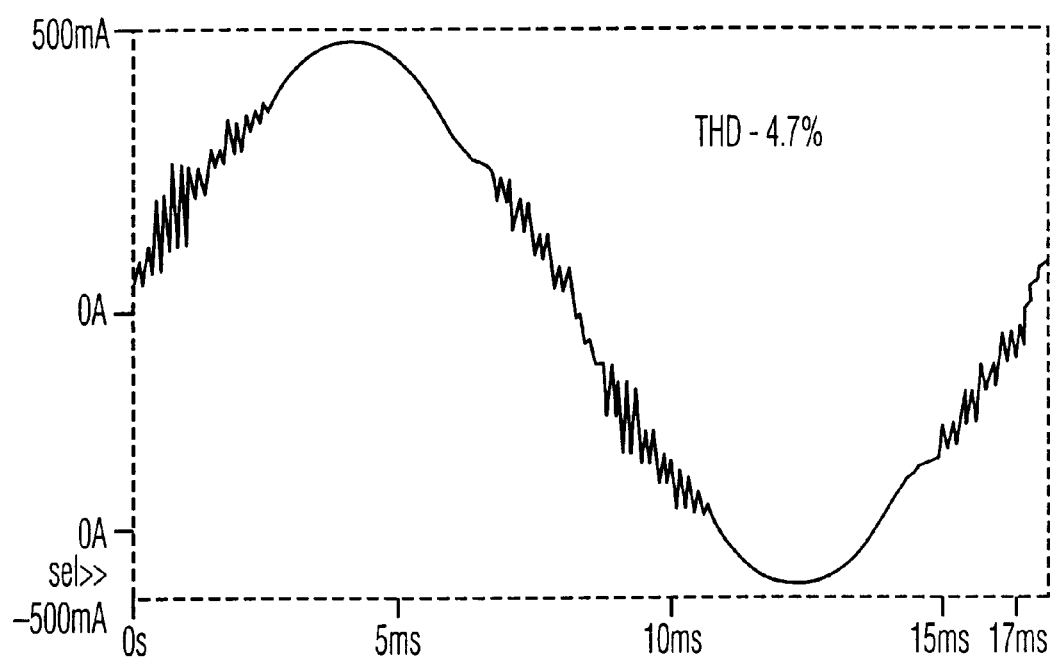
FIG. 7 is a simulation of line current for the circuit of FIG. 5.

The simulated line current of FIG. 7 shows high frequency ripples because of the modest size of the EMI filter inductance simulated. The total harmonic distortion is less than 5%. These ripples may be minimized by increasing the inductance and/or capacitance of the EMI filter.

Those of ordinary skill will recognize that many variations of the disclosed embodiments are possible within the spirit of the invention. For example, as shown, a full wave bridge rectifier can use all normal recovery speed diodes, which are very inexpensive, and two fast recovery diodes, or the positive and negative DC buses can be connected respectively to a conventional four diode bridge all of whose diodes have a sufficiently fast recovery. The power feedback principle is also applicable to a converter having a voltage doubler type rectifier circuit. The load circuit can have other configurations, so long as it is basically a series resonant circuit. For example, the load connections can be to a matching transformer. The resonance capacitor can be either in parallel with the lamp, or series capacitors can be used, normally with a step-up transformer, to permit operation of multiple lamps without any special lamp starting circuitry. The EMI filter inductance can be in either or both input conductors, and is required only to satisfy governmental or power company requirements.

What is claimed is:

1. A low frequency to high frequency power converter comprising:

a capacitive source impedance source of low frequency line voltage, having source connection points between which the low frequency line voltage is maintained, a DC supply circuit having at least two diodes and four terminals, and an energy storage capacitor, two of said terminals being AC-side terminals connected to said source connection points, and two of said terminals being DC-side terminals, one of said diodes being connected between one of the AC-side terminals and one of the DC-side terminals, a half-bridge inverter connected to receive DC voltage from said DC-side terminals, said inverter comprising two switching transistors connected in series and having an output node between said transistors for providing a high frequency output voltage, a load circuit carrying a first high frequency current, connected between said output node and one of said DC-side terminals, said load circuit comprising a plurality of load circuit elements including a resonance inductor, at least one resonance capacitor forming part of a resonant circuit with said resonance inductor, and two load connection points for a non-linear load which is at least substantially resistive in an operating condition, and a high frequency capacitor providing a path for a second high frequency current, said high frequency capacitor being connected between one of said AC-side terminals and a location along said load circuit at which there is a voltage at said high frequency, said high frequency capacitor having a value selected such that said high frequency capacitor receives energy from one of said AC-side terminals during a first portion of every cycle of said high frequency voltage, and said high frequency capacitor transfers energy directly to said energy storage capacitor during a different portion of every cycle of said high frequency voltage, via a capacitive and non-inductive energy transfer.

2. A converter as claimed in claim 1, characterized in that said non-linear load is a discharge lamp, and said DC supply circuit is a full wave bridge rectifier having four diodes.

3. A converter as claimed in claim 1, characterized in that said location along said load circuit is one of said load connection points, the other of said load connection points being said one of said DC-side terminals.

4. A converter as claimed in claim 3, characterized in that said non-linear load is a discharge lamp.

5. A converter as claimed in claim 4, characterized in that said DC supply circuit comprises a full wave bridge rectifier having four slow diodes, and two fast recovery diodes, one of said two fast recovery diodes being connected between one of said DC-side terminals and two of the slow diodes, and the other fast recovery diode being connected between the other of said DC-side terminals and the other two of the slow diodes.

6. A converter as claimed in claim 4, characterized in that during normal operation said DC supply circuit never transfers energy directly from said AC-side terminals to said energy storage capacitor.

7. A converter as claimed in claim 4, characterized in that the component values of the converter and the inverter operating frequency are selected such that $V_B = 2 V_f$, where $V_B$ is the voltage across the energy storage capacitor, and $V_f$ is the peak voltage of the high frequency output voltage.

8. A converter as claimed in claim 1, characterized in that said location along said load circuit is said output node.

9. A converter as claimed in claim 8, characterized in that said converter comprises a second high frequency capacitor connected between the other of said AC-side terminals and said location.

10. A converter as claimed in claim 8, characterized in that said non-linear load is a discharge lamp, and said converter comprises a second high frequency capacitor connected between the other of said AC-side terminals and said location.

11. A converter as claimed in claim 8, characterized in that said DC supply circuit comprises a full wave bridge rectifier having four slow diodes, and two fast recovery diodes, one of said two fast recovery diodes being connected between one of said DC-side terminals and two of the slow diodes, and the other fast recovery diode being connected between the other of said DC-side terminals and the other two of the slow diodes.

12. A converter as claimed in claim 8, characterized in that during a portion of each high frequency cycle of normal operation the line input provides energy directly to the load circuit.

* * * * *